United States Patent
Pauly (10) Patent No.: US 8,214,480 B2
(45) Date of Patent: Jul. 3, 2012

(54) METHOD OF IDENTIFYING A ROOT CAUSE OF A NETWORK EVENT

(75) Inventor: Duncan Gunther Pauly, Tetbury (GB)

(73) Assignee: Zenulta Limited, Wiltshire (GB)

( * ) Notice: Subject to any disclaimer, the term of this patent is extended or adjusted under 35 U.S.C. 154(b) by 0 days.

(21) Appl. No.: 12/596,274

(22) PCT Filed: Apr. 15, 2008

(86) PCT No.: PCT/GB2008/001326
§ 371 (c)(1),
(2), (4) Date: Feb. 15, 2010

(87) PCT Pub. No.: WO2008/129243
PCT Pub. Date: Oct. 30, 2008

(65) Prior Publication Data
US 2010/0138533 A1    Jun. 3, 2010

(30) Foreign Application Priority Data

Apr. 18, 2007   (GB) .................................. 0707513.8

(51) Int. Cl.
*G06F 15/173* (2006.01)
(52) U.S. Cl. ...................................................... 709/223
(58) Field of Classification Search .................. 709/223
See application file for complete search history.

(56) References Cited

U.S. PATENT DOCUMENTS 5,159,685 A * 10/1992 Kung ............................. 714/26
(Continued)

FOREIGN PATENT DOCUMENTS
GB          2318479         4/1998
(Continued)

OTHER PUBLICATIONS

Chakrabarti, S. et al., Scalable Feature Selection, Classification and Signature Generation for Organizing Large Text Databases into Hierarchical Topic Taxonomies, Aug. 1998, Springer-Verlag New York, Inc., The VLDB Journal—The International Journal on Very Large Data Bases, vol. 7, Issue 3, pp. 163-178.*

(Continued)

*Primary Examiner* — Wing Chan
*Assistant Examiner* — Alicia Baturay
(74) *Attorney, Agent, or Firm* — Husch Blackwell LLP (57) ABSTRACT

A method of identifying a root cause of an event in a network of linked entities. The method comprises: defining a plurality of signatures, each signature comprising one or more classes, the classes being categorized by a taxonomy of classes; receiving a first message from the network; assigning one or more of the signatures to the first message; establishing a set of one or more hypotheses, each hypothesis identifying a respective root cause; and one of the signatures assigned to the first message; receiving one or more subsequent messages from the network; determining whether each subsequent message matches a signature identified by a previously hypothesis; and generating an output based on the determination.

Typically the method involves an element of human interaction. Typically at least one of the signatures includes a class which encloses two or more subclasses categorized by the taxonomy of classes. The ability to define signatures including such higher level entity classes in the taxonomy enables a human user to generate, store and edit generic hypotheses quickly and intuitively, and/or provides an output which can be easily understood by a human user.

16 Claims, 6 Drawing Sheets

U.S. PATENT DOCUMENTS

| | | | | |
|---|---|---|---|---|
| 5,261,044 | A | * | 11/1993 | Dev et al. ...................... 715/855 |
| 5,295,244 | A | * | 3/1994 | Dev et al. ...................... 715/853 |
| 5,309,448 | A | * | 5/1994 | Bouloutas et al. .............. 714/25 |
| 5,483,637 | A | | 1/1996 | Winokur et al. |
| 5,504,921 | A | * | 4/1996 | Dev et al. ...................... 709/223 |
| 6,484,203 | B1 | * | 11/2002 | Porras et al. .................. 709/224 |
| 6,766,368 | B1 | | 7/2004 | Jakobson et al. |
| 7,219,239 | B1 | * | 5/2007 | Njemanze et al. ................ 726/3 |
| 7,376,635 | B1 | * | 5/2008 | Porcari et al. .......................... 1/1 |
| 7,376,969 | B1 | * | 5/2008 | Njemanze et al. .............. 726/22 |
| 7,603,461 | B2 | * | 10/2009 | Crosby et al. ................. 709/224 |
| 7,607,169 | B1 | * | 10/2009 | Njemanze et al. .............. 726/22 |
| 7,650,638 | B1 | * | 1/2010 | Njemanze et al. .............. 726/23 |
| 7,788,722 | B1 | * | 8/2010 | Njemanze et al. .............. 726/23 |
| 7,899,901 | B1 | * | 3/2011 | Njemanze et al. ............ 709/224 |
| 7,904,962 | B1 | * | 3/2011 | Jajodia et al. .................... 726/25 |
| 2004/0193943 | A1 | * | 9/2004 | Angelino et al. ................. 714/4 |

FOREIGN PATENT DOCUMENTS

| | | |
|---|---|---|
| GB | 2406741 | 4/2005 |
| WO | WO01/77828 | 10/2001 |
| WO | WO03/005200 | 1/2003 |
| WO | WO03/042918 | 5/2003 |

OTHER PUBLICATIONS

Kiriha, Y, et al., "Fault Analysis Expert System for Unified Network Management: EXNETS", NEC Research and Development, Nippon, vol. 33, No. 1, Jan. 1992.

* cited by examiner

METHOD OF IDENTIFYING A ROOT CAUSE OF A NETWORK EVENT

FIELD OF THE INVENTION

The present invention relates to a method of identifying a root cause of an event in a network of linked entities.

BACKGROUND OF THE INVENTION

A number of correlation techniques are currently available for identifying a root cause of an event in a network of linked entities. These include rule sequence, state transition, codebook and case based analysis. Each of these exhibits flaws that reduce the effectiveness and worth of the correlation process.

The correlation process may require precise and complete modelling of the physical network topology for a reasoned analysis of events. Any inaccuracies in the physical topology model arising from unavailable, stale, incomplete or incorrect information will undermine the accuracy of any analysis performed.

Moreover, the model used to depict the network structure may be rigid and unable to dynamically adapt to new information about network entity configuration and topology changes, creating inevitable errors in the correlation process when changes to the network occur.

The rules that guide the correlation process can be non-intuitive and make the analysis of the root cause event opaque and incomprehensible to human observers, which limits the trust that humans will place on the outcome of any analysis and restricts their ability to recognize why or where an outcome is inaccurate. This hinders the evolution of the correlation process in becoming a more consistent, accurate and complete process by restricting human interaction in the correlation process.

The context used for aggregating events under a common cause may be transient causing related events to be missed when they are delayed by communication lags and failures and arrive after the relevant correlation context has lapsed.

The overhead of the correlation process itself may enforce restrictions on the throughput of the events considered for correlation and the volume of events received for correlation may be attenuated by prior filtering and consolidation, which inevitably limit the information available to the correlation process and its accuracy.

The correlation model may recognize only narrow aspects of network functionality and associated operational activities and be unaware of all the information relevant to network status and performance. A partial view of the information relevant to a situation undermines the accuracy of the analysis performed around it.

SUMMARY OF THE INVENTION

A first aspect of the invention provides a method of identifying a root cause of an event in a network of linked entities, the method comprising:
   a. defining a plurality of signatures, each signature comprising one or more classes, the classes being categorized by a taxonomy of classes;
   b. receiving a first message from the network;
   c. assigning one or more of the signatures to the first message;
   d. establishing a set of one or more hypotheses, each hypothesis identifying:
      i. a respective root cause; and
      ii. one of the signatures assigned to the first message;
   e. receiving one or more subsequent messages from the network;
   f. determining whether each subsequent message matches a signature identified by a hypothesis established in step d; and
   g. generating an output based on the determination in step f.

Typically the method involves an element of human interaction. That is, a human may provide input into step a. of the process, and/or may be presented with the output generated in step g. Typically at least one of the signatures defined in step a. may include a class which encloses two or more subclasses categorized by the taxonomy of classes. The ability to define signatures including such higher level entity classes in the taxonomy enables such a human user to generate, store and edit generic hypotheses quickly and intuitively, and/or provides an output which can be easily understood by such a human user.

Typically at least one of the signatures comprises a plurality of envelope sets each comprising a set of classes; wherein each envelope set is associated with one or more sub-events related to the root cause; and wherein a signature is assigned to the first message in step c if the first message matches a set of classes in at least one of that signature's envelope sets.

Typically at least one of the signatures comprises a message class categorized by a taxonomy of message classes and defining a message topic; and wherein steps c and f comprise matching a message class of the message with the message class of the signature.

Typically at least one of the signatures comprise one or more entity classes categorized by a taxonomy of entity classes, each entity class defining an entity type; and steps c and f comprise matching an entity class of the message with the entity class of the signature.

Typically at least one of the signatures comprise one or more association classes categorized by a taxonomy of association classes, each association class defining a type of connection between two directly communicating entities; and steps c and f comprise matching an association class of the message with the association class of the signature.

Typically the method further comprises giving the one or more hypotheses scores, and amending the scores when the signatures associated with them match subsequent received messages. In this case the method may further comprise promoting a hypothesis to an elected phase when its score reaches a predetermined level, increasing its score when the signature associated with it matches a message, and decreasing the score of any other co-existing hypotheses whose signature also matches the message.

Typically step f comprises comparing an observation time associated with the subsequent message with an event time associated with the hypothesis established in step d.

A second aspect of the invention provides a method of identifying a root cause of an event in a network of linked entities, the method comprising:
   a. receiving a first message from the network;
   b. establishing a first hypothesis associated with the first message;
   c. receiving one or more subsequent messages from the network;
   d. for each subsequent message:
      i. establishing a new hypothesis, and;
      ii. determining whether the subsequent message matches any previously established hypothesis by comparing an observation time associated with the message with an event time associated with the hypothesis; and e. generating an output based on the determination in step d.ii.

By establishing a new hypothesis for each subsequent message as well as matching against previously established hypotheses, the method can provide an accurate estimation of the root cause. Note that some received messages may not establish new hypotheses, for instance if they do not match a previously defined signature.

A further aspect of the invention provides a network analysis engine, comprising physical computing machinery, configured to identify a root cause of an event in a network of linked entities by the method of any preceding aspect.

A further aspect of the invention provides a non-transitory tangible computer-readable medium having code embedded therein that comprises a program or suite of programs for controlling the operating of a network analysis engine, the program(s) being arranged when executed to control the network analysis engine so as to operate in accordance with the method of any previous aspect.

Although the embodiment below describes the invention in the context of a telecommunication network, this is for illustrative purposes only and the invention can be used to identify a root cause of an event in any network of linked entities.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
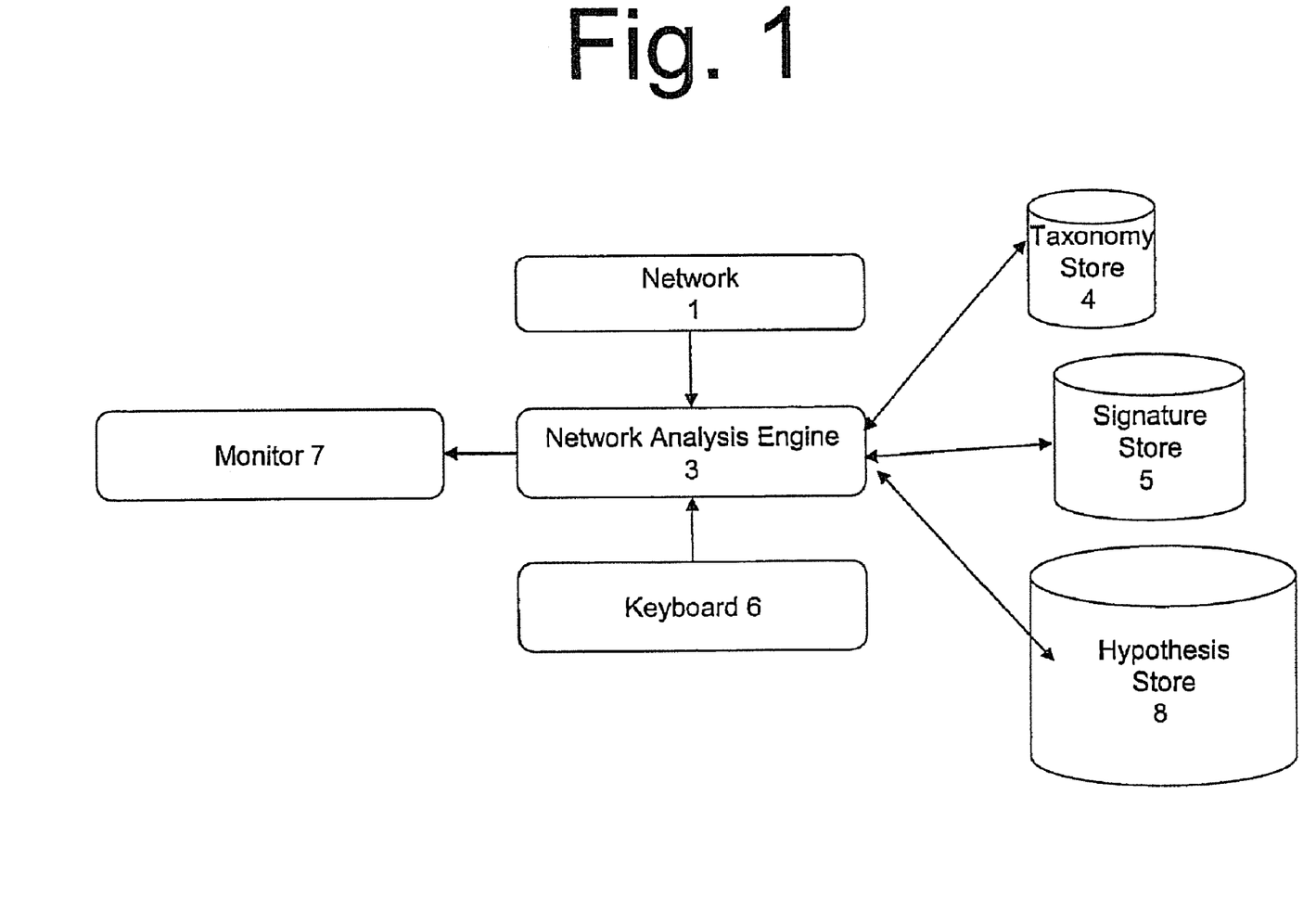
FIG. 1 is a schematic view of a system architecture.
Figure 2:
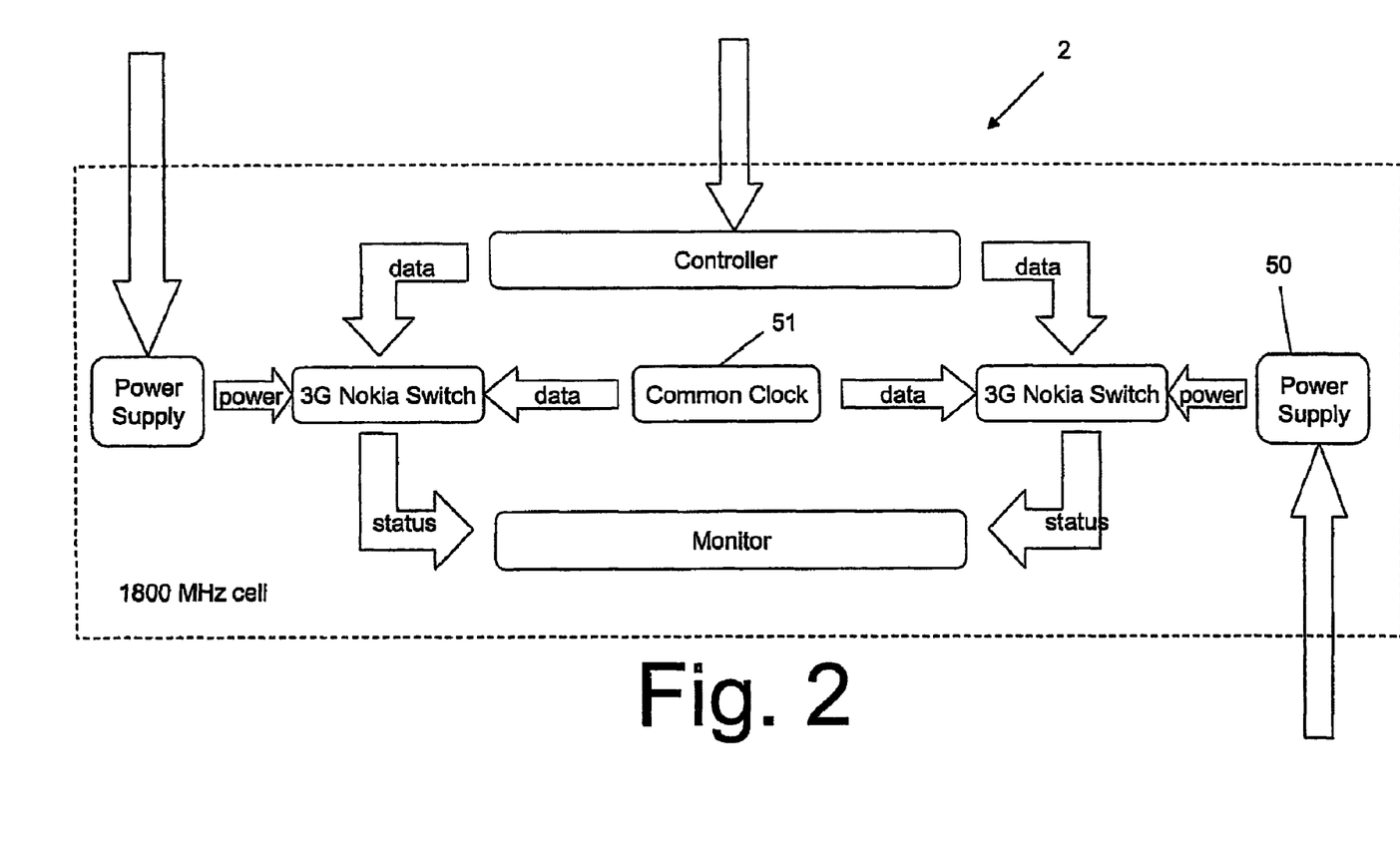
FIG. 2 shows a portion of the network.

FIG. 1 illustrates a telecommunication network 1, a portion 2 of the network being shown in FIG. 2. The network 1 is a graph of entities linked by associations, the associations being indicated by block arrows. Each entity provides a physical or logical function that contributes to the overall service provided by the network. Functional links between entities that do not directly represent physical assets of the network are known as "associations".

Entities report messages to a network analysis engine 3 shown in FIG. 1. These messages notify the engine 3 of functional performance and significant events. When a single abnormality (or other event) occurs within the network 1, one or more entities may notify the engine 3 of alarm conditions associated directly or indirectly with the abnormality. To a network observer, the root cause of the abnormality may not be immediately apparent from the various messages notified. Indeed, a large volume of indirectly symptomatic messages may serve to conceal the most indicative and relevant messages.

The engine 3 performs network event correlation to collect and aggregate the related symptomatic messages and discern a common aspect in order to suggest a root cause for the abnormality. The engine 3 performs event aggregation, as described in further detail below, to reduce the volume of information that has to be assimilated by network observers to promote clarity and assist in focusing effort at identifying the root cause.

Figure 3:
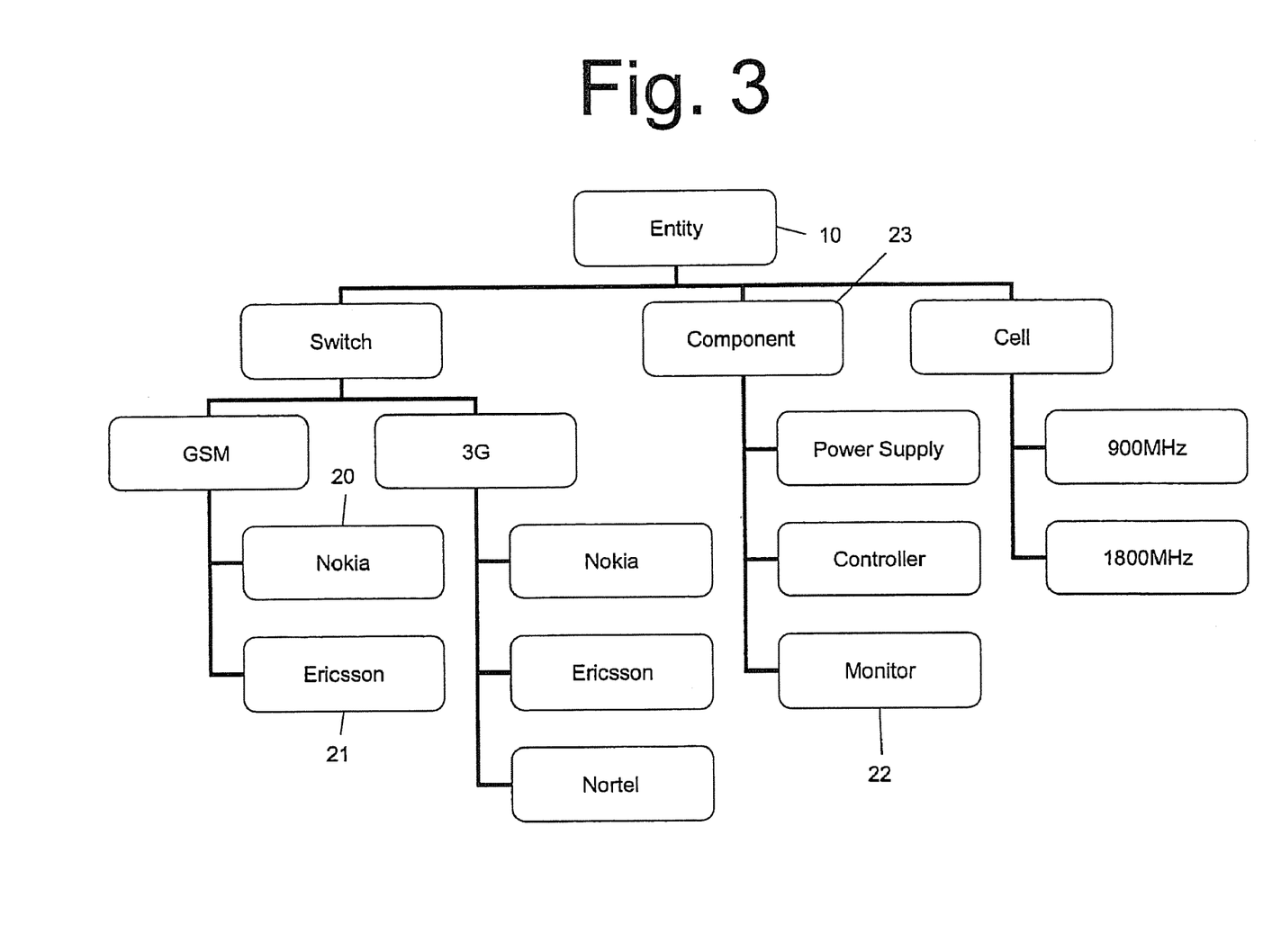
FIG. 3 shows an entity taxonomy.

The entities in the network are categorized by the engine 3 into a complete taxonomy of entity classes shown in FIG. 3. The taxonomy is rooted by a single generic and indistinct entity class 10, and each subclass inherits the properties of its enclosing class. The entity taxonomy of FIG. 3 is stored by the engine 3 in a taxonomy store 4 shown in FIG. 1.

Figure 4:
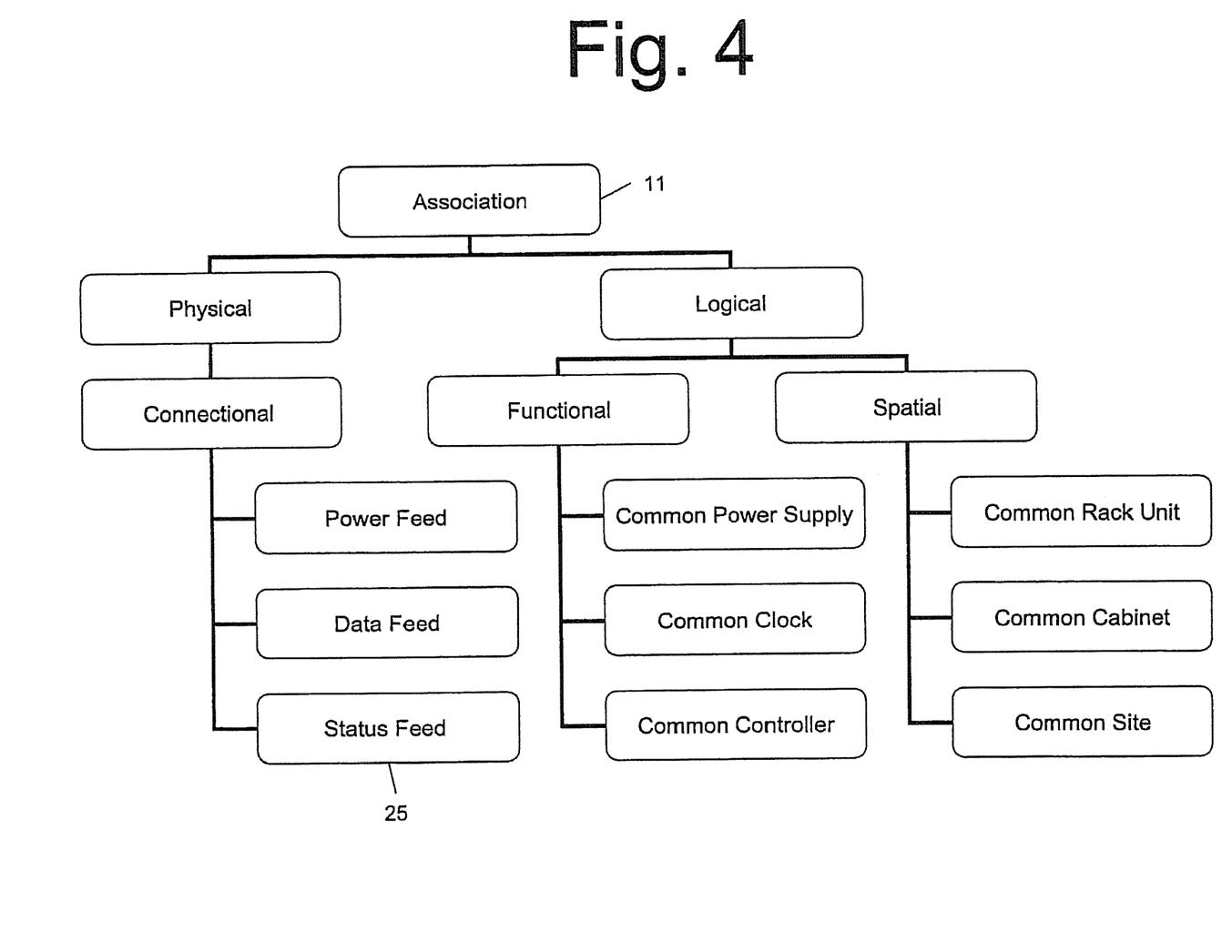
FIG. 4 shows an association taxonomy.

An association symbolizes the connection between two directly communicating entities within the network. An association is passive, but is purposeful and every association in the network is categorized within a complete taxonomy of association classes shown in FIG. 4. The taxonomy is rooted by a single generic and indistinct association class 11 and each subclass inherits the properties of its enclosing class. The association taxonomy of FIG. 4 is stored by the engine 3 in the taxonomy store 4 shown in FIG. 1 along with the entity taxonomy.

A message conveys information about an event relevant to an entity associated with the network. A message may raise an event or may clear a pre-existing event. A message may be the event itself, in which case it is never cleared.

A message is issued by an observing entity at an observation time and contains information about an observed entity associated directly or indirectly with the observing entity.

Figure 5:
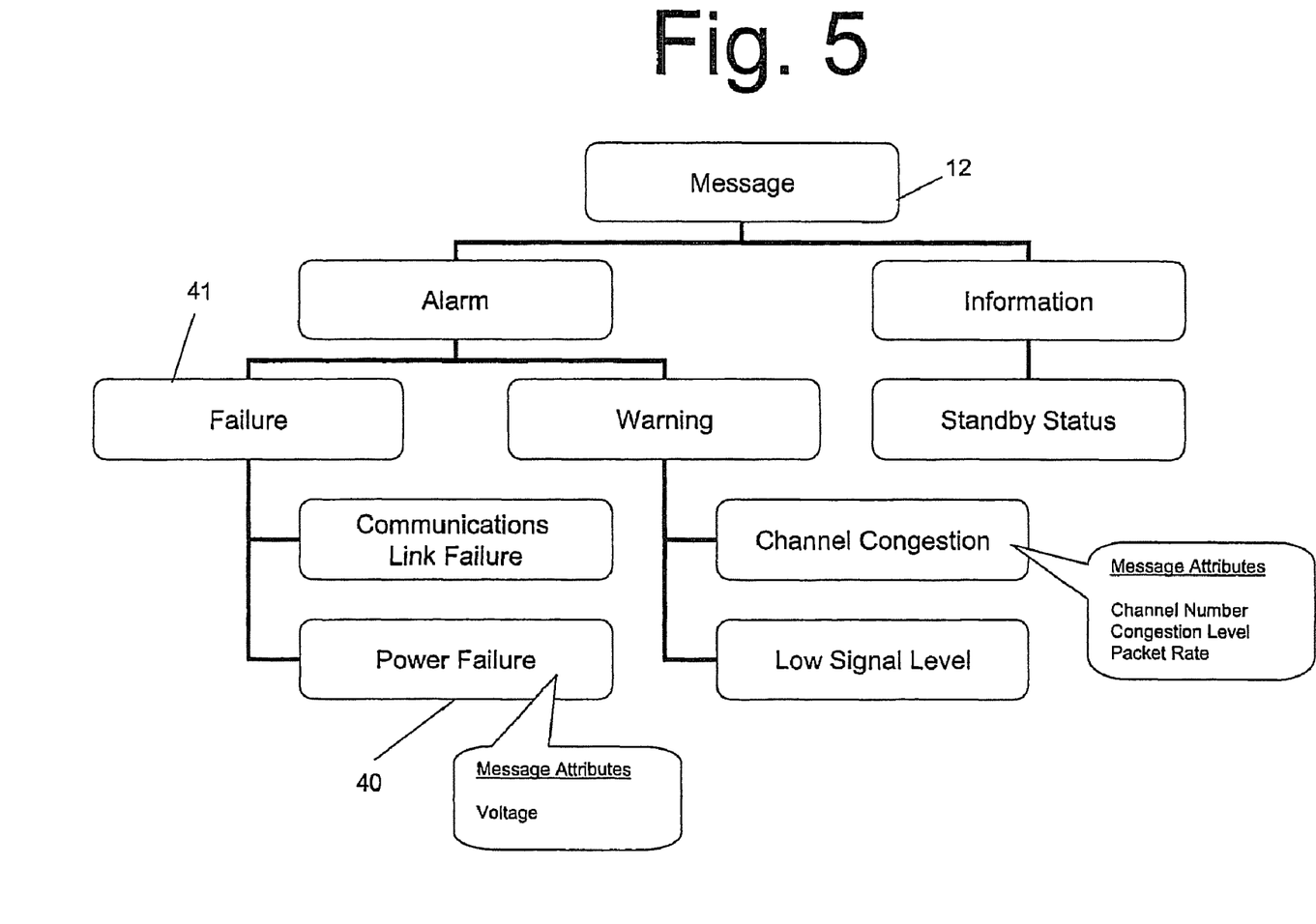
FIG. 5 shows a message taxonomy.

Every message topic is categorized within a complete taxonomy of message classes shown in FIG. 5. The taxonomy is rooted by a single generic and indistinct message class 12 and each subclass inherits the properties of its enclosing class. The message taxonomy of FIG. 5 is stored along with the other taxonomies in the taxonomy store 4 shown in FIG. 1.

Every message has a perceived severity of critical, major, minor, information or unknown. This severity is specified for every message class in the taxonomy of message classes. For example, with reference to FIG. 5, all failure messages may have a severity of "major" and all warning messages may have a severity of "minor".

Every message also has a priority of resolution which is a number from a bounded range of possible numbers. This priority is specified for every message class in the taxonomy of message classes. For example, with reference to FIG. 5, all failure messages may have a priority of 8/10 and all warning messages may have a priority of 3/10. The priority is used to order messages of a common severity to apply a relative scale of importance. For example one critical message may have a higher priority than another critical message to indicate it needs attention first—even though both indicate a major problem that needs urgent attention.

Attributes represent the aspects of the state of entities, and entities of a common class will be characterized by common attributes. For example, with reference to FIG. 3, entities 20,21 in the "GSM switch" class will have a common "GSM switch" attribute.

Messages impart information about attributes associated with an observed entity. For example, with reference to FIG. 5 the power failure message (40) has a voltage attribute that specifies the current voltage level provided by the power supply entity under the current failure condition.

The correlation method performed by the network analysis engine 3 simultaneously gathers symptomatic messages under multiple speculative hypotheses. Each hypothesis associates messages under a message signature centred on a candidate entity in the network proposed as the hypothetical root cause.

Each hypothesis is derived from a signature which is generated, stored and edited by user input, via keyboard 6 (or some other input device). The user generates the signatures by having knowledge and experience of the failure modes of the network. Furthermore, the user may refine the signatures over time by reviewing historical message data and analyzing its associated root causes. The signatures are stored in a signature store 5 shown in FIG. 1.

Figure 6:
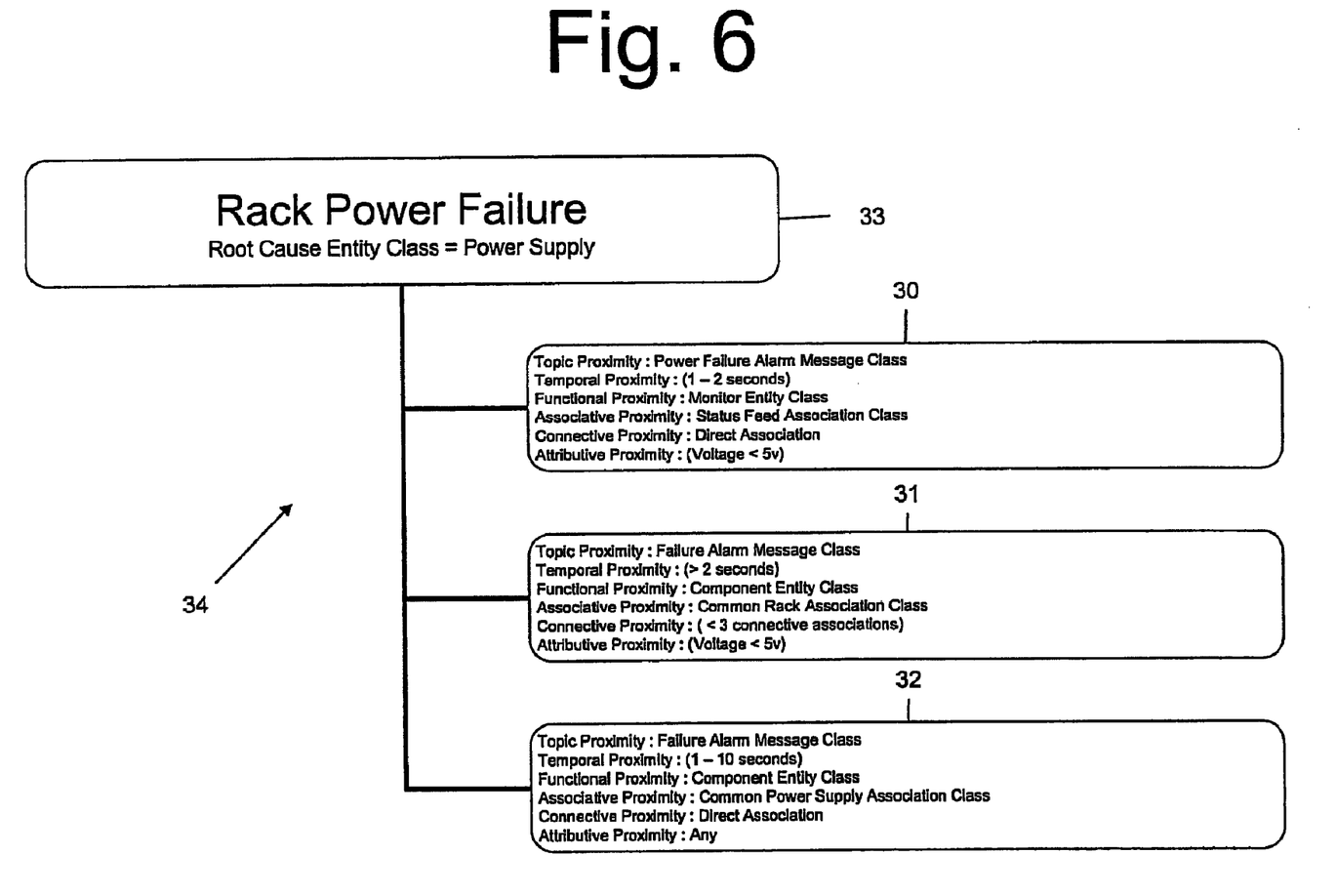
FIG. 6 shows a signature.

FIG. 6 gives an example of a signature 34. The signature comprises three envelope sets 30-32, each associated with a hypothetical root cause 33. In this case the hypothetical root cause 33 is Rack Power Failure. Note that the signature 34 is generic, in the sense that it does not refer to a specific candidate entity within the network. Each envelope set 30-32 comprises a set of proximity envelopes. Each envelope set collates observed messages under a conjunctive orthogonal proximity envelope relative to the hypothetical root cause 33. For example the set 30 comprises six proximity envelopes, each envelope defining a topical, temporal, functional, associative, connective or attributive proximity.

The stringency of each envelope for associating messages can be as strong or weak as the generality of the signature requires.

A topical proximity envelope applies a message classification envelope to a symptomatic message. For example the topical proximity envelope for the set 30 defines a "Power Failure Alarm" message class, indicated at 40 in FIG. 5. Any symptomatic messages that fall outside the message classification envelope (in other words any messages which are not "Power Failure Alarm" messages) are excluded from the hypothesis. A topical proximity envelope is able to refer to any entity class within the message class taxonomy shown in FIG. 5.

Note that the "Power Failure" message class 40 defined by the set 30 is at the lowest level of the taxonomy of FIG. 5, and is a subclass enclosed by the higher level "Failure Alarm" message class 41. In contrast, the "Failure Alarm" message class 41 defined by the sets 31 and 32 is a higher level class which encloses the subclass 40, as well as one other subclass (the "Communications Link Failure" subclass). The ability to define such higher level entity classes enables a user to generate, store and edit generic signatures quickly and intuitively.

A temporal proximity envelope applies a time envelope to the observation time of a symptomatic message relative to the event time of the hypothetical root cause. For example the temporal proximity envelope for the set 30 defines an observation time of 1-2 seconds relative to the event time of the hypothetical root cause. Any symptomatic messages with an observation time outside the time envelope are excluded from the hypothesis.

A functional proximity envelope applies an entity classification envelope to the observed entity notifying a symptomatic message. For example the functional proximity envelope for the set 30 defines a "Monitor" entity class, indicated at 22 in FIG. 3, whereas the functional proximity envelopes for the sets 31 and 32 define a "Component" entity class, indicated at 23 in FIG. 3. Any symptomatic messages for an observed entity that fall outside of the classification envelope are excluded from the hypothesis. A functional proximity envelope is able to refer to any entity class within the entity class taxonomy shown in FIG. 3.

Note that the "Monitor" entity class 22 defined by the set 30 is at the lowest level of the taxonomy of FIG. 3, and is a subclass enclosed by the higher level "Component" entity class 23. In contrast, the "Component" entity class 23 defined by the sets 31 and 32 is a higher level class which encloses the subclass 22, as well as two other subclasses (the "Power Supply" and "Controller" subclasses). The ability to define such higher level entity classes in the taxonomy enables a user to generate, store and edit generic signatures quickly and intuitively.

An associative proximity envelope applies an association classification envelope to the associations between the hypothetical root cause entity and the observed entity identified in a symptomatic message. For example the associative proximity envelope for the set 30 defines a "Status Feed" association class, indicated at 25 in FIG. 4. Any symptomatic messages for an observed entity that fall outside of the association classification envelope are excluded from the hypothesis. An associative proximity envelope is able to refer to any association class within the association class taxonomy shown in FIG. 4.

Note that the association classes defined by the sets 30-32 are all at the lowest level of the taxonomy of FIG. 4. However, alternative signature sets may define higher level association classes such as "Connectional" or "Spatial", enabling a user to generate, store and edit generic signatures quickly and intuitively.

A connective proximity envelope applies an association distance envelope to the associations between the hypothetical root cause entity and the observed entity identified in a symptomatic message. The concept of "association distance" can be illustrated with reference to FIG. 2. For example the Controller has a "Direct" association with the 3G Nokia Switch, since they have a "data" association linking them directly. By contrast, the Controller has an "Indirect" association with the Monitor, since they are linked indirectly via the 3G Nokia Switch. The connective proximity envelope for the set 30 shown in FIG. 6 defines a "Direct" association between the observed entity and the hypothetical root cause entity. Any symptomatic messages for an observed entity that fall outside of the association distance envelope are excluded from the hypothesis.

An attributive proximity envelope applies a value envelope to an attribute notified in a symptomatic message. For example the attributive proximity envelope for the set 30 defines an attribute value of "Voltage <5V". Any symptomatic messages with an attribute value that falls outside of the attribute value envelope are excluded from the hypothesis.

The method of operation of the network analysis engine will now be described.

When a first message is received by the engine 3 from network 1, the engine 3 looks up the message in the taxonomy store 4 and assigns it a set of classes and subclasses.

The engine 3 then retrieves all signatures in signature store 5 which have at least one envelope set matching the set of classes and subclasses assigned to the first message. In this step, the engine may retrieve zero signatures, or more likely a large number of signatures. The engine 3 then establishes a hypothesis for each signature, and stores them in an established hypothesis store 8. Each established hypothesis specifies: a respective root cause (identifying a particular entity and event time); and a signature associated with that root cause.

For example, if the received message is a power failure alarm message with a voltage attribute <5V, from a monitor with a direct association with a power supply, and a "status feed" association with that power supply, then it matches the envelope set 30 shown in FIG. 6. The engine therefore establishes a new "Rack Power Failure" hypothesis which identifies a specific power supply entity (for instance the power supply 50 in FIG. 2) and an event time relative to the observation time of the failure alarm message. In this case the event time will be 2 seconds before the observation time of the failure alarm message.

Each established hypothesis has a hypothesis score (initially set to zero).

The engine 3 then compares subsequent messages with all previously established hypotheses in the hypothesis store 8. If a subsequent message falls within the classes identified by one or more of the envelope sets defined by a hypothesis, then the score of that hypothesis is increased. A message may be matched by more than one envelope, but this is more likely by accident than design, so the message should only contribute towards the score once, even if it matches two envelopes.

As well as comparing subsequent messages with all established hypotheses, the engine 3 also establishes a new set of hypotheses for each subsequent message having at least one matching signature. A message will not generate a new hypothesis if there are no matching signatures. A significant proportion of messages may never initiate a hypothesis and remain un-correlated.

Each message gathered under an established hypothesis increases the score of that hypothesis (or in some cases, decreases its score-see the section below describing the elected phase). As the score of a hypothesis changes, the hypothesis evolves through multiple phases. The possible phases for a hypothesis are: the anticipated phase, suspected phase, elected phase, cleared phase, completed phase, suspended phase, confirmed phase, refuted phase and the abandoned phase. Thus, as the score of a hypothesis increases, it moves up from the anticipated phase, to the suspected phase and so on.

The anticipation phase is an initial phase when there are very few messages associated with the hypothesis and there is little evidence to support the hypothesis.

The next phase is a suspected phase when there are enough messages gathered under the hypothesis to make it probable.

The elected phase is when the evidence is strong enough to make the hypothesis definite. At this point, each subsequent message gathered under the newly elected hypothesis is "revoked" for any co-existing un-elected hypothesis that shares the same message. In other words, any co-existing un-elected hypothesis that shares the same message has its score reduced instead of increased.

Each signature 34 is associated with a particular signature event. For instance, the signature 34 is associated with a rack power failure event. Also, each envelope 30-32 is associated with one or more sub-events, which are related in turn to the signature event. For instance the envelope 30 is associated with a monitor power failure event, occurring 1-2 seconds after the rack power failure event. A monitor power failure alarm (message) will be issued when the monitor power failure (event) occurs. Subsequently, the monitor power failure will be rectified and another message will be issued by the network 1 to the network analysis engine 3. At this point, the event is "cleared" by the network analysis engine 3. The cleared phase is when sufficient events have been cleared in an elected hypothesis. Thereafter a cleared hypothesis will only absorb messages related to events it has already cleared and will continue to absorb them until it expires. That is, once a hypothesis is cleared it will only collect messages that clear events it has already correlated. Note that a message may also indicate a change in circumstance for an event—eg change in severity or change in details for a power failure.

The completed phase is when all significant activity against a hypothesis has lapsed.

The engine simultaneously evaluates multiple speculative hypotheses, allowing each hypothesis to evolve until a single hypothesis can be resolved and elected as the root cause.

The suspended phase is when a hypothesis fails to progress to a subsequent phase in the required time. It is suspended pending further activity or until it expires.

A hypothesis enters the abandoned phase when at least one message matching the hypothesis is revoked by an elected hypothesis.

The confirmed phase is when a human operator manually confirms (via keyboard 6) the hypothesis that has yet to become elected and is treated as an elected phase in all other respects.

The refuted phase is when a human operator manually refutes (via keyboard 6) the hypothesis irrespective of whether it has become elected and is treated as an abandoned phase in all other respects.

A hypothesis expires when it completes, or when it has remained suspended and inactive for a sufficient period of time.

The phases of a hypothesis progress linearly as thresholds are reached. These thresholds may be expressed as: a) volumes of distinct messages, b) distinct events or c) distinct entities, as discussed in detail below.

a) Number of different messages. In this example, a hypothesis moves into a new phase when the number of messages matching that hypothesis exceeds a threshold (independently of the number of actual events). The threshold can be expressed as:
  i) total number of messages accumulated over the life of the hypothesis;
  ii) average number of messages accumulated per specified time period;
  iii) average number of messages per envelope/event; or
  iv) average number of messages per entity.

b) Number of separate events. In this example, a hypothesis moves into a new phase when the number of matched sub-events exceeds a threshold, regardless of the number of messages notified about each sub-event. For example in the case of FIG. 6 there are three sub-events associated with the signature, and each sub-event has a particular envelope 30-32. When a message is received which matches the envelope 30, then that sub-event is "matched". When the number of matched sub-events (or envelopes) exceeds a threshold then the hypothesis changes phase. The threshold can be expressed as:
  i) total number of events accumulated over the life of the hypothesis;
  ii) average number of events accumulated per specified time period;
  iii) average number of events per entity.

c) Number of network entities. Each message is associated with a particular network entity. In this example, a hypothesis changes phase when messages are matched with that hypothesis which are associated with a number of network entities above a threshold. The threshold can be expressed as:
  i) total number of entities accumulated over the life of the hypothesis; or
  ii) average number of entities accumulated per specified time period.

Each phase has a timeout such that if it fails to progress to the next phase in that time, the hypothesis can either automatically progress to the next phase or can be suspended until it either expires or new relevant messages are observed later at which point it reverts back to its phase prior to suspension.

Each hypothesis has a defined severity of critical, major, minor, information or unknown and the severity remains unchanged throughout its lifetime, other than by optional assignment by human operator.

Each phase of a hypothesis has a defined priority within a bounded range of priority numbers. Each hypothesis has one priority defined. This is used to prioritize hypotheses with the same severity, similar to the message priority described above.

Every hypothesis notifies of a phase change by outputting one or more messages when the phase change occurs. These messages are of a class nominated by the signature from the complete taxonomy of message classes and can be issued singularly for the phase or in response to each distinct message, event or entity observed during a phase. Each message can be targeted at specific entities or specific entity classes near the candidate root cause entity. The observation time for the notification is the time of the phase change; the observed and observing entities are the correlation system itself; and the event notified is the specific phase change for that specific hypothesis. The severity and priority of the message notified are those of the hypothesis at the time of notification. Such messages may or may not be correlated under other signatures for additional hypotheses.

Each message collected under one or more hypotheses is only visible to human operators and other network management processes within the context of the hypotheses to which it has been associated.

Each message that fails to be collected under any hypothesis is made directly visible to human operators and other network management processes.

The output generated by the process may be displayed on monitor 7, printed, stored or transmitted electronically to a remote client. An example of the output generated by the process is given in Table 1 below:

TABLE 1

| Signature | Candidate Root Cause Entity | Severity | Event Time | % Elected |
|---|---|---|---|---|
| Rack Power Failure | power supply 50 | major | 12:00:45 | 75% |
| Clock Low Signal Level | common clock 51 | minor | 08:14:26 | 100% |

Table 1 lists two hypotheses. The first hypothesis is a power failure in the power supply 50 shown in FIG. 2, at 12:00:45. This is categorized as a major incident and is not yet elected. The second hypothesis is a clock failure in the common clock 51 shown in FIG. 2, at 08:14:26. This is categorized as a minor incident and is 100% elected.

Although the invention has been described above with reference to one or more preferred embodiments, it will be appreciated that various changes or modifications may be made without departing from the scope of the invention as defined in the appended claims.

The invention claimed is:

1. A method of identifying a root cause of an event in a network of linked entities, the method comprising:
   a. defining a plurality of signatures, each signature comprising one or more classes, the classes being categorized by a taxonomy of classes;
   b. receiving a first message from the network;
   c. assigning one or more of the signatures to the first message;
   d. establishing a set of one or more hypotheses, each hypothesis identifying:
      i. a respective root cause; and
      ii. one of the signatures assigned to the first message;
   e. receiving one or more subsequent messages from the network;
   f. determining whether each subsequent message matches a signature identified by a hypothesis established in step d; and
   g. generating an output based on the determination in step f;

wherein at least one of the signatures comprise one or more association classes categorized by a taxonomy of association classes, each association class defining an association between two entities; and wherein steps c and f comprise matching an association class of the message with the association class of the signature.

2. The method of claim 1 wherein at least one of the signatures comprises a plurality of envelope sets each comprising a set of classes; wherein each envelope set is associated with one or more sub-events related to the root cause; and
   wherein a signature is assigned to the first message in step c if the first message matches a set of classes in at least one of that signature's envelope sets.

3. The method of claim 1 wherein at least one of the signatures comprises a message class categorized by a taxonomy of message classes and defining a message topic; and steps c and f comprise matching a message class of the message with the message class of the signature.

4. The method of claim 1 wherein at least one of the signatures comprise one or more entity classes categorized by a taxonomy of entity classes, each entity class defining an entity type; and steps c and f comprise matching an entity class of the message with the entity class of the signature.

5. The method of claim 1 wherein at least one of the signatures includes a class which encloses two or more sub-classes categorized by the taxonomy of classes.

6. The method of claim 1 wherein the signatures are defined by a human in step a.

7. The method of claim 1 further comprising giving the one or more hypotheses scores, and amending the scores when the signatures associated with them match subsequent received messages.

8. The method of claim 7 further comprising promoting a hypothesis to an elected phase when its score reaches a predetermined level, increasing its score when the signature associated with it matches a message, and decreasing the score of any other co-existing hypotheses whose signature also matches the message.

9. The method of claim 1 wherein step f comprises comparing an observation time associated with the subsequent message with an event time associated with the hypothesis established in step d.

10. A network analysis engine comprising physical computing machinery configured to identify a root cause of an event in a network of linked entities by the method of claim 1.

11. A non-transitory tangible computer readable medium having code embedded therein for controlling the operating of a network analysis engine in accordance with the method of claim 1.

12. The method of claim 1 wherein step c comprises looking up the first message in a taxonomy store and assigning a set of classes and subclasses to the first message.

13. A method of identifying a root cause of an event in a network of linked entities, the method comprising:
   a. receiving a first message from the network;
   b. establishing a first hypothesis associated with the first message;
   c. receiving one or more subsequent messages from the network;
   d. for each subsequent message:
      i. establishing a new hypothesis, and;
      ii. determining whether the subsequent message matches any previously established hypothesis by comparing an observation time associated with the message with an event time associated with the hypothesis;
e. generating an output based on the determination in step d.ii; and
f. defining a plurality of signatures, wherein any subsequent message which does not match one of the signatures does not establish a new hypothesis, and wherein at least one of the signatures comprise one or more association classes categorized by a taxonomy of association classes, each association class defining an association between two entities.

14. The method of claim 13 further comprising presenting the output to a user.

15. A network analysis engine comprising physical computing machinery configured to identify a root cause of an event in a network of linked entities by the method of claim 13.

16. A non-transitory tangible computer readable medium having coded embedded therein for controlling the operating of a network analysis engine in accordance with the method of claim 13.

* * * * *